(12) United States Patent
Kilgard

(10) Patent No.: US 7,466,318 B1
(45) Date of Patent: Dec. 16, 2008

(54) AVOIDING UNNECESSARY UNCOVERED TEXTURE FETCHES

(75) Inventor: Mark J. Kilgard, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 582 days.

(21) Appl. No.: 11/125,472

(22) Filed: May 10, 2005

Related U.S. Application Data

(60) Provisional application No. 60/671,294, filed on Apr. 13, 2005.

(51) Int. Cl.
*G09G 5/00* (2006.01)

(52) U.S. Cl. .................. 345/582; 345/629; 345/552; 717/124

(58) Field of Classification Search ............... None
See application file for complete search history.

(56) References Cited

U.S. PATENT DOCUMENTS

| | | | |
|---|---|---|---|
| 6,333,746 B1 * | 12/2001 | Vaswani et al. ............. | 345/582 |
| 6,427,234 B1 | 7/2002 | Chambers et al. | |
| 6,501,482 B1 * | 12/2002 | Rosman et al. ............. | 345/587 |
| 6,724,394 B1 | 4/2004 | Zatz et al. | |
| 2003/0095134 A1 * | 5/2003 | Tuomi et al. ................ | 345/611 |

FOREIGN PATENT DOCUMENTS

EP    1489560 A1 * 12/2004

\* cited by examiner

*Primary Examiner*—Kee M Tung
*Assistant Examiner*—Kevin K Xu
(74) *Attorney, Agent, or Firm*—Patterson & Sheridan LLP

(57) ABSTRACT

Systems and methods for avoiding unnecessary uncovered texture fetches may improve texture mapping performance. A shader program compiler performs data-flow analysis to determine if texture fetches may be required for pixels that are not covered by a graphics primitive fragment. A graphics driver then determines which texture maps do not require texels for uncovered neighbor pixels, dependent on texture filter mode information, thereby avoiding unnecessary uncovered texture fetches.

20 Claims, 12 Drawing Sheets

AVOIDING UNNECESSARY UNCOVERED TEXTURE FETCHES

CROSS-REFERENCE TO RELATED APPLICATIONS

This application claims benefit of from commonly owned co-pending U.S. provisional patent application Ser. No. 60/671,294, titled "Avoiding Unnecessary Uncovered Texture Fetches," filed Apr. 13, 2005, having a common inventor and assignee as this application, which is herein incorporated by reference.

BACKGROUND OF THE INVENTION

1. Field of the Invention

Embodiments of the present invention generally relate to computer graphics, and more particularly to reading texture map data.

2. Description of the Related Art

Conventional graphics processors are exemplified by systems and methods developed to read data stored in texture maps, texels. Conventionally, texture maps are stored in a graphics memory device and texels read from a texture map are returned to the graphics processor after several clock cycles. Graphics processing may stall waiting for the texels or a buffer may be used to store data that requires the texels for further processing. The same graphics memory device is typically also used to store frame buffer data, including one or more display buffers. The bandwidth between the graphics memory device and the graphics processor is used to access texture maps and frame buffer data. Sometimes graphics processing performance is limited by the bandwidth available between the graphics memory device and the graphics processor.

Accordingly, there is a need to minimize unnecessary texture fetches in order to improve graphics processing performance.

SUMMARY OF THE INVENTION

The current invention involves new systems and methods for avoiding unnecessary texture fetches.

Various embodiments of a method of the invention for avoiding unnecessary texture fetches include performing data-flow analysis of a shader program to produce information identifying texture fetches needed to perform a subsequent computation and enabling the texture fetches needed to perform a subsequent computation for uncovered pixels within a pixel group.

Various embodiments of a method of the invention for avoiding unnecessary texture fetches including determining that first texture data is used to fetch second texture data and enabling or disabling texture fetches of the first texture data for uncovered pixels within a pixel group based on a filtering mode indicated for the second texture data.

Various embodiments of the invention include a system for performing graphics data processing. The system includes a graphics driver and a graphics processor. The graphics driver is configured to determine whether or not texture data for uncovered pixels should be fetched from memory and produce configuration information. The graphics processor is configured to fetch texture data for uncovered pixels based on the configuration information.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1A:
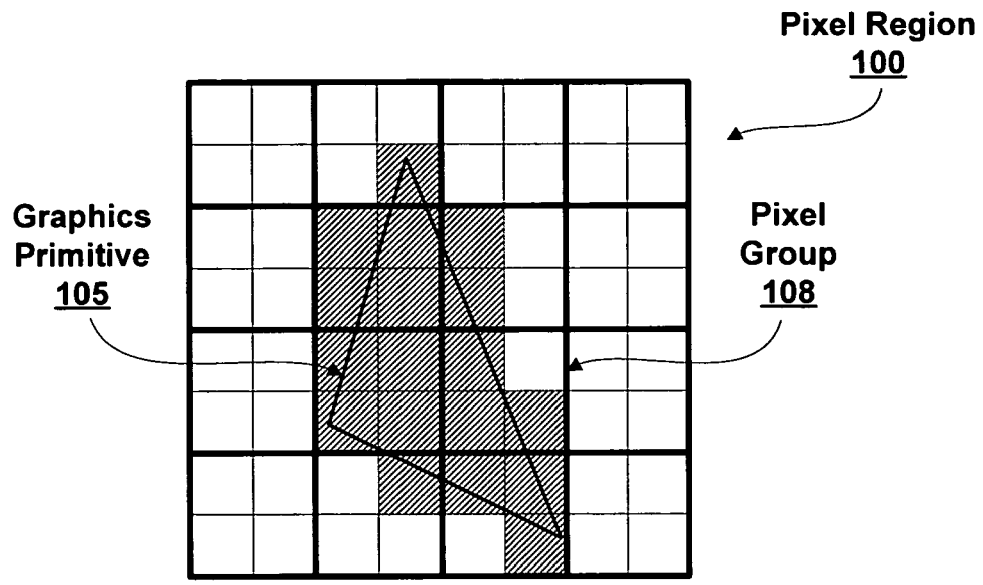
FIG. 1A illustrates graphics primitive coverage of a pixel region in accordance with one or more aspects of the present invention.

FIG. 1A illustrates graphics primitive coverage of a pixel region 100 in accordance with one or more aspects of the present invention. Pixel region 100 is divided into a grid of pixel groups, including pixel group 108. Each pixel group includes 4 pixels arranged in a 2×2. In other embodiments of the present invention, a pixel group size may be N×M, where N and M are integers. An L-shaped arrangement of 3 pixels is another possible arrangement of a pixel group that may be used to perform finite differencing. The intersection of a graphics primitive, such as graphics primitive 105, with a pixel results in a fragment. A fragment may cover an entire pixel or a portion of the pixel. When at least one fragment lies within a pixel group, the pixel group is processed to determine a final pixel color for each pixel covered by a fragment. Pixels in pixel region 100 that are considered covered by graphics primitive 105 are filled with a pattern. Pixels are considered covered if any portion of graphics primitive 105 intersects the pixel. In other embodiments of the present invention, pixels are considered covered if the center of the pixel, or any of a set of sample points within the pixel are within graphics primitive 105.

Figure 1B:
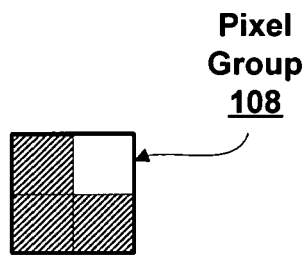
FIG. 1B illustrates graphics primitive coverage of a pixel group of FIG. 1A in accordance with one or more aspects of the present invention.

FIG. 1B illustrates graphics primitive coverage of pixel group 108 of FIG. 1A in accordance with one or more aspects of the present invention. Three of the four pixels within pixel group 108 are covered by a fragment of graphics primitive 105. The fourth pixel within pixel group 108 is not covered by a fragment of graphics primitive 105 and is therefore uncovered. Rather than processing each pixel independently, a pixel group is processed in order to use a single instruction multiple data (SIMD) type of architecture, leveraging common control signals for processing multiple pixels in parallel.

Processing pixels as pixel group may also improve cache performance since a cache line may correspond to multiple pixels, such as a pixel group. Furthermore, some graphics computations require screen-space partial derivatives. Such partial derivatives are easily (approximately) computed by performing finite differencing with neighboring pixel fragment values. When computing partial derivatives for a pixel group, values for all four pixels are needed, regardless of whether or not all four pixels are covered. In contrast, when partial derivatives will not be computed for a pixel group, values, including texels, do not need to be determined for uncovered pixels. Avoiding unnecessary computations for uncovered pixels may improve graphics processing performance, reduce power consumption, and reduce the amount of bandwidth needed between a graphics processor and memory device storing texture data. Texture data may include, but is not limited to, color, alpha, intensity, depth, shadow information, displacements, offsets, indices, stencils, or other values.

Figure 1C:
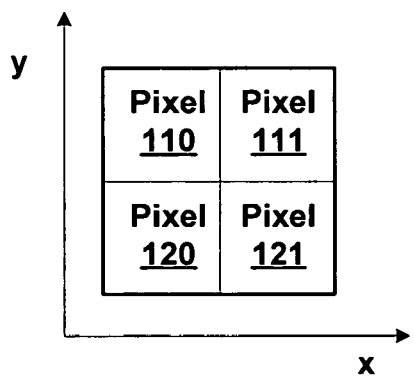
FIG. 1C illustrates neighboring pixels used for computing partial derivatives in accordance with one or more aspects of the present invention.

FIG. 1C illustrates neighboring pixels used for computing partial derivatives in accordance with one or more aspects of the present invention. Partial derivatives are computed to determine a level-of-detail (LOD) corresponding to a particular texture map resolution when mip mapped texture maps are used. Another reason partial derivatives may be necessary for texture map fetches is to determine the direction of anisotropy when performing anisotropic filtering. Partial derivative operations are also needed to support the DDX and DDY graphics operations to implement functionality such as the OpenGL Shading Language functions dFdx, dFdy, and fwidth. A partial derivative with respect to x is computed by performing finite differencing between neighboring pixels within a pixel group that are aligned along the x axis. Each pixel may include several attributes, e.g., red, green, blue, alpha, depth, texture coordinates, or the like, and a partial derivative may be computed for each attribute. For example, an x partial derivative may be computed for a pixel 111 by subtracting an attribute of a pixel 110 with the corresponding attribute of pixel 111. Likewise, a y partial derivative may be computed for pixel 111 by subtracting an attribute of a pixel 121 with the corresponding attribute of pixel 111. This same differencing procedure can be applied to the other pixels 110, 120, and 121 in the pixel group. Even though attribute values of uncovered pixels may not be valid, those values are effectively nearby extrapolations of the values just beyond the covered pixels and so serve as reasonable surrogates for finite differencing and produce better results than using a default value for the uncovered pixel attributes.

When a partial derivative will be computed for an attribute that includes texel data, such as a dependent texture, texels for all four pixels within the pixel group must be fetched, regardless of whether or not all four pixels are covered by a fragment. A conventional texel fetch unit always fetches all four texels for a pixel group, regardless of whether or not all four texels are covered since it is usually not known if a texel will be needed for a subsequent computation, such as a partial derivative computation. As the size of graphics primitives decreases, more pixel groups will be partially covered, having fewer than four pixels covered, and more texels will be fetched for uncovered pixels. Texture memory bandwidth and latency may be reduced and texture cache performance may be improved by avoiding fetches of texels for uncovered pixels when the texels aren't needed for a subsequent computation. A texture fetch performed for an uncovered pixel that is not actually needed for a subsequent computation, such as a finite difference computation, is referred to as a "paranoid texture fetch." In some conventional graphics processors, insufficient knowledge about subsequent possible finite differences involving fetched values for uncovered pixels meant graphics processors performed these unnecessary texture fetches.

Figure 2:
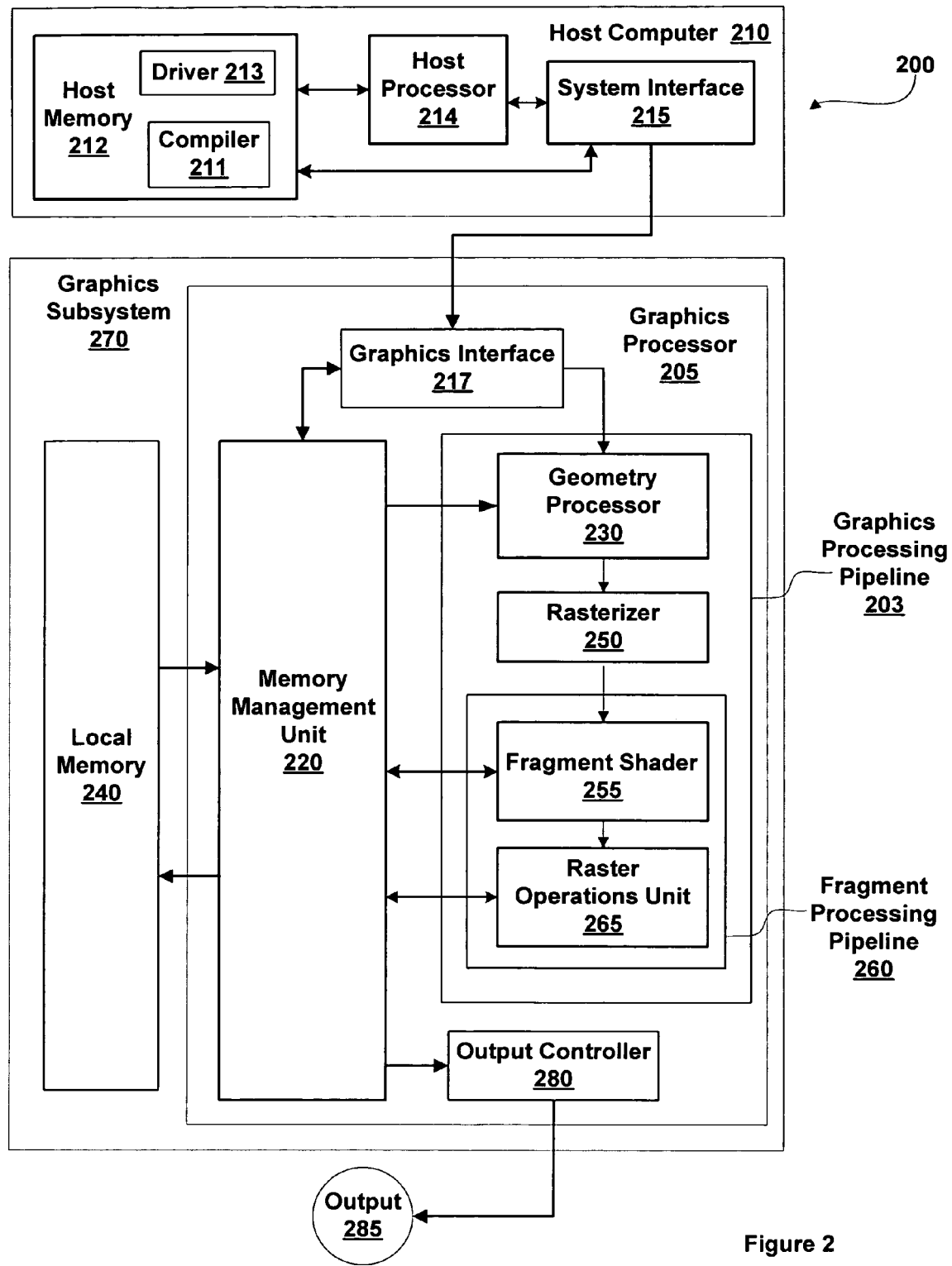
FIG. 2 is a block diagram of an exemplary embodiment of a respective computer system, including a host computer and a graphics subsystem, in accordance with one or more aspects of the present invention.

FIG. 2 is a block diagram of an exemplary embodiment of a respective computer system, including a host computer 210 and a graphics subsystem 270, in accordance with one or more aspects of the present invention. Computing system 200 may be a desktop computer, server, laptop computer, palm-sized computer, tablet computer, game console, portable wireless terminal such as a PDA or cellular telephone, computer based simulator, or the like. Host computer 210 includes host processor 214 that may include a system memory controller to interface directly to host memory 212 or may communicate with host memory 212 through a system interface 215. System interface 215 may be an I/O (input/output) interface or a bridge device including the system memory controller to interface directly to host memory 212. An example of system interface 215 known in the art includes Intel® Northbridge.

Figure 4A:
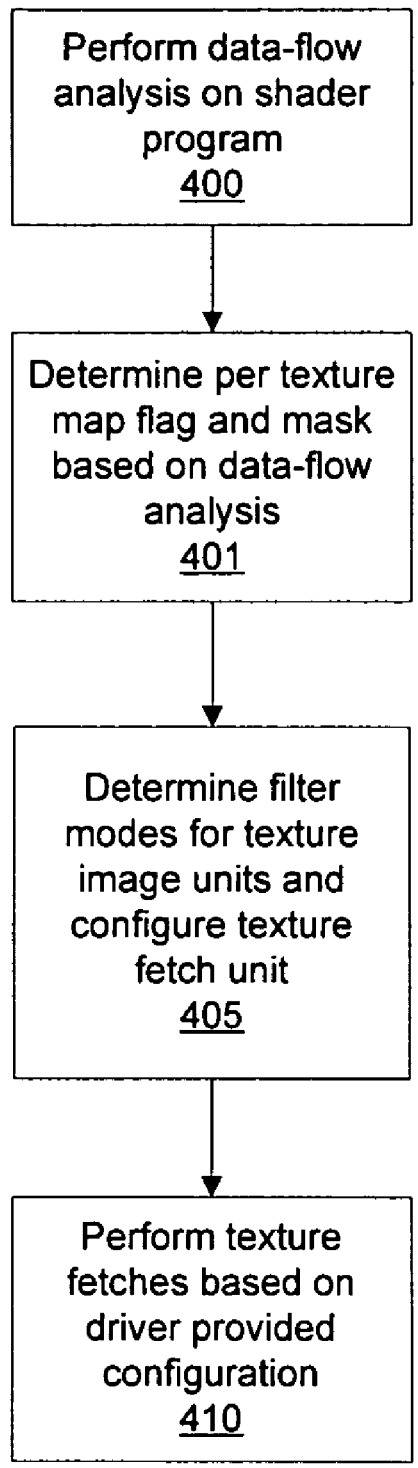
FIG. 4A illustrates an embodiment of a method for avoiding unnecessary uncovered texture fetches in accordance with one or more aspects of the present invention.
Figure 4B:
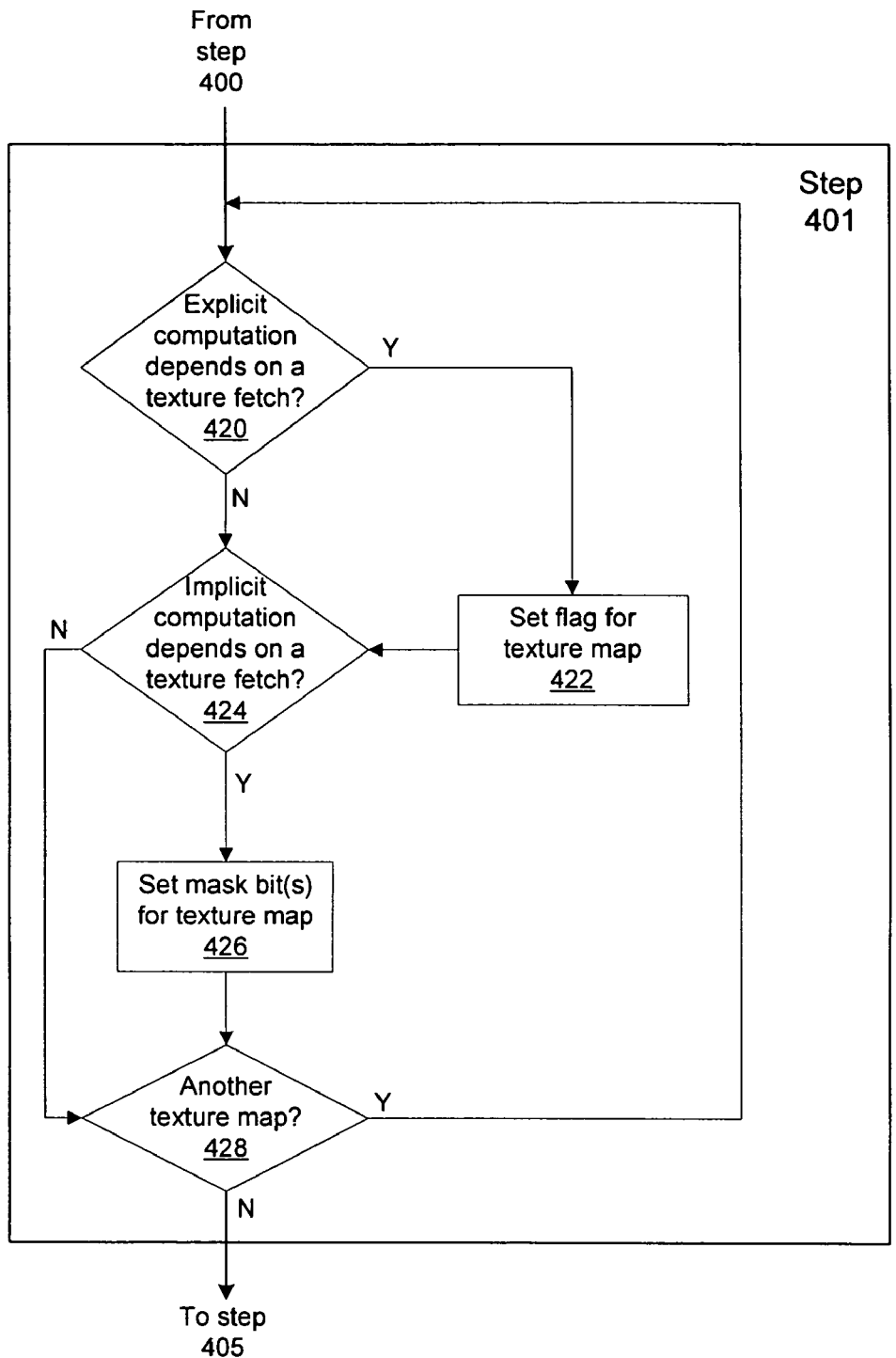
FIG. 4B illustrates an embodiment of a method for performing data-flow analysis for avoiding unnecessary uncovered texture fetches in accordance with one or more aspects of the present invention.

A graphics application compiler, compiler 211 compiles a shader program and performs a data-flow analysis of a shader program, as described in conjunction with FIG. 4B, producing shader program instructions for execution by a programmable graphics processor 205. A graphics device driver, driver 213, interfaces between processes executed by host processor 214, such as application programs, and a programmable graphics processor 205, translating program instructions generated by compiler 211 as needed for execution by programmable graphics processor 205. Driver 213 also uses commands to configure sub-units within programmable graphics processor 205. Specifically, driver 213 may configure a texture fetch unit within graphics subsystem 270 to disable uncovered texture fetches for one or more texture maps or for one or more shader instructions, as described in conjunction with FIG. 4C. Each texture map corresponds to a particular texture map, i.e., texture identifier.

Graphics subsystem 270 includes a local memory 240 and programmable graphics processor 205. Host computer 210 communicates with graphics subsystem 270 via system interface 215 and a graphics interface 217 within programmable graphics processor 205. Data, program instructions, and commands received at graphics interface 217 can be passed to a graphics processing pipeline 203 or written to a local memory 240 through memory management unit 220. Programmable graphics processor 205 uses memory to store graphics data, including texture maps, and program instructions, where graphics data is any data that is input to or output from computation units within programmable graphics processor 205. Graphics memory is any memory used to store graphics data or program instructions to be executed by programmable graphics processor 205. Graphics memory can include portions of host memory 212, local memory 240 directly coupled to programmable graphics processor 205, storage resources coupled to the computation units within programmable graphics processor 205, and the like. Storage resources can include register files, caches, FIFOs (first in first out memories), and the like.

In addition to Interface 217, programmable graphics processor 205 includes a graphics processing pipeline 203, a memory controller 220 and an output controller 280. Data and program instructions received at interface 217 can be passed to a geometry processor 230 within graphics processing pipeline 203 or written to local memory 240 through memory controller 220. In addition to communicating with local memory 240, and interface 217, memory controller 220 also communicates with graphics processing pipeline 203 and output controller 280 through read and write interfaces in graphics processing pipeline 203 and a read interface in output controller 280.

Within graphics processing pipeline 203, geometry processor 230 and a programmable graphics fragment processing pipeline, fragment processing pipeline 260, perform a variety of computational functions. Some of these functions are table lookup, scalar and vector addition, multiplication, division, coordinate-system mapping, calculation of vector normals, tessellation, calculation of derivatives, interpolation, filtering, and the like. Geometry processor 230 and fragment processing pipeline 260 are optionally configured such that data processing operations are performed in multiple passes through graphics processing pipeline 203 or in multiple passes through fragment processing pipeline 260. Each pass through programmable graphics processor 205, graphics processing pipeline 203 or fragment processing pipeline 260 concludes with optional processing by a raster operations unit 265.

Vertex programs are sequences of vertex program instructions compiled by host processor 214 for execution within geometry processor 230 and rasterizer 250. Shader programs are sequences of shader program instructions compiled by host processor 214 for execution within fragment processing pipeline 260. Geometry processor 230 receives a stream of program instructions (vertex program instructions and shader program instructions) and data from interface 217 or memory controller 220, and performs vector floating-point operations or other processing operations using the data. The program instructions configure subunits within geometry processor 230, rasterizer 250 and fragment processing pipeline 260. The program instructions and data are stored in graphics memory, e.g., portions of host memory 212, local memory 240, or storage resources within programmable graphics processor 205. When a portion of host memory 212 is used to store program instructions and data, the portion of host memory 212 can be uncached so as to increase performance of access by programmable graphics processor 205. Alternatively, configuration information is written to registers within geometry processor 230, rasterizer 250 and fragment processing pipeline 260 using program instructions, encoded with the data, or the like.

Data processed by geometry processor 230 and program instructions are passed from geometry processor 230 to a rasterizer 250. Rasterizer 250 is a sampling unit that processes primitives and generates sub-primitive data, such as fragment data, including parameters associated with fragments (texture identifiers, texture coordinates, and the like). Rasterizer 250 converts the primitives into sub-primitive data by performing scan conversion on the data processed by geometry processor 230. Rasterizer 250 outputs fragment data and shader program instructions to fragment processing pipeline 260. The fragment data includes a coverage mask for each pixel group that indicates which pixels within the pixel group are covered by the fragment.

The shader programs configure the fragment processing pipeline 260 to process fragment data by specifying computations and computation precision. Fragment shader 255 is optionally configured by shader program instructions such that fragment data processing operations are performed in multiple passes within fragment shader 255. During processing the fragment shader 255 may modify the coverage information to "kill" fragments. Fragment shader 255 includes texture unit 290 to perform anisotropic or isotropic texture mapping and produce filtered texels. Texture unit 290 may be configured to perform uncovered texture fetches or to only perform texture fetches for covered pixels. The textured fragments are processed using techniques known to those skilled in the art to produce shaded fragment data.

Fragment shader 255 outputs the shaded fragment data, e.g., color and depth, and codewords generated from shader program instructions to raster operations unit 265. Raster operations unit 265 includes a read interface and a write interface to memory controller 220 through which raster operations unit 265 accesses data stored in local memory 240 or host memory 212. Raster operations unit 265 optionally performs near and far plane clipping and raster operations, such as stencil, z test, blending, and the like, using the fragment data and pixel data stored in local memory 240 or host memory 212 at a pixel position (image location specified by x,y coordinates) associated with the processed fragment data. The output data from raster operations unit 265 is written back to local memory 240 or host memory 212 at the pixel position associated with the output data and the results, e.g., image data are saved in graphics memory.

When processing is completed, an output 285 of graphics subsystem 270 is provided using output controller 280. Alternatively, host processor 214 reads the image stored in local memory 240 through memory controller 220, interface 217 and system interface 215. Output controller 280 is optionally configured by opcodes to deliver data to a display device, network, electronic control system, other computing system 200, other graphics subsystem 270, or the like.

Figure 3A:
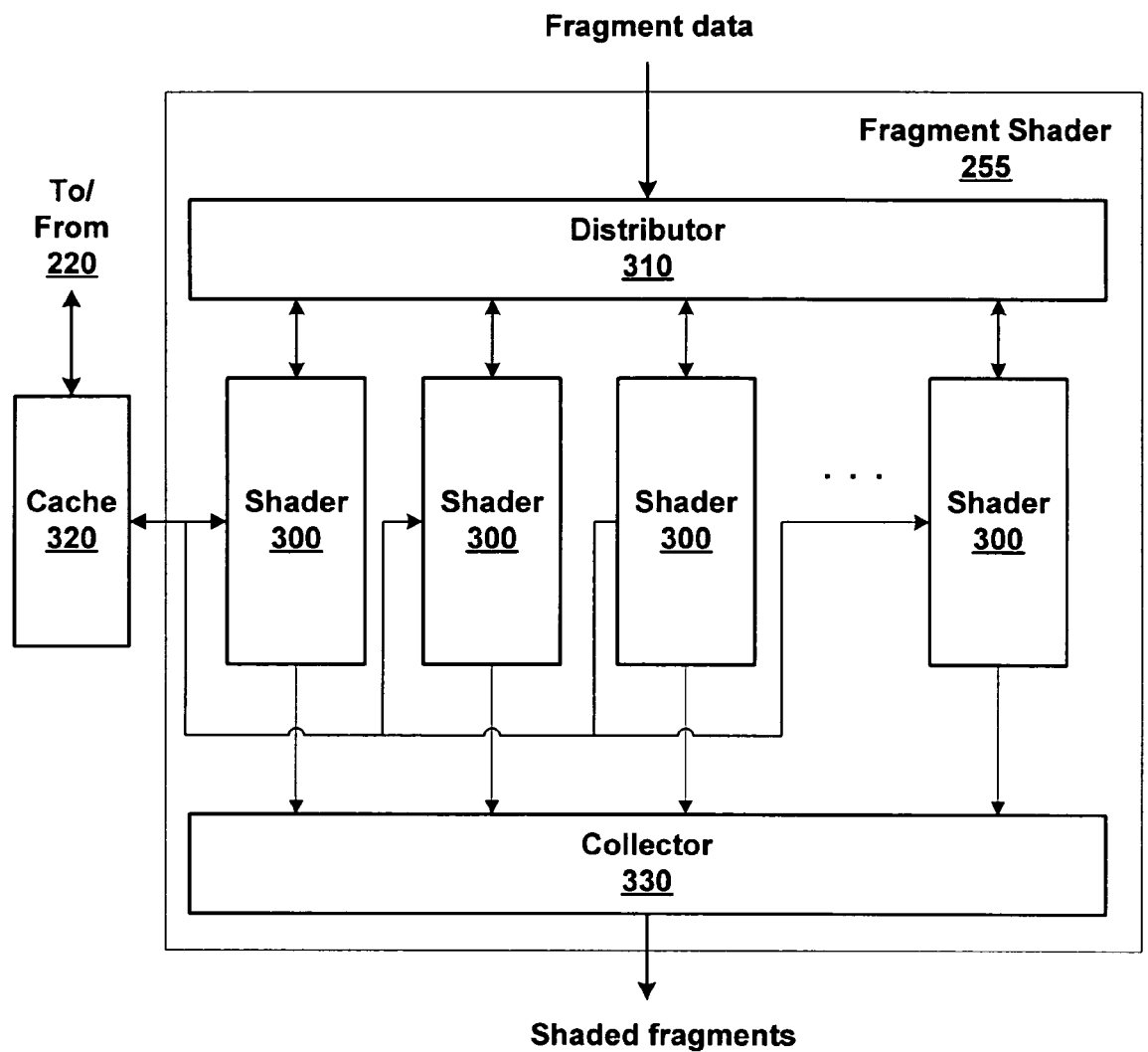
FIG. 3A is a block diagram of an exemplary embodiment of the fragment shader from FIG. 2 in accordance with one or more aspects of the present invention.

FIG. 3A is a block diagram of fragment shader 255 shown in FIG. 2 in accordance with one or more aspects of the present invention. One or more fragment shader 300 may be included within fragment shader 255. Each shader 300 is configured to receive shader program instructions and fragment data from a distributor 310. The fragment data are processed according to the shader program instructions to produce shaded fragments. Each shader 300 includes an interface to a cache 320 for reading texture data. As previously described, shader 300 may be configured by driver 213 to perform uncovered texture fetches. In some embodiments of the present invention, cache 320 is omitted and each shader 300 interfaces directly with memory management unit 220. Each shader 300 outputs shaded fragments to a collector 330.

Collector 330 reorders the shaded fragments as needed and outputs the shaded fragments to raster operations unit 265 of FIG. 2.

Figure 3B:
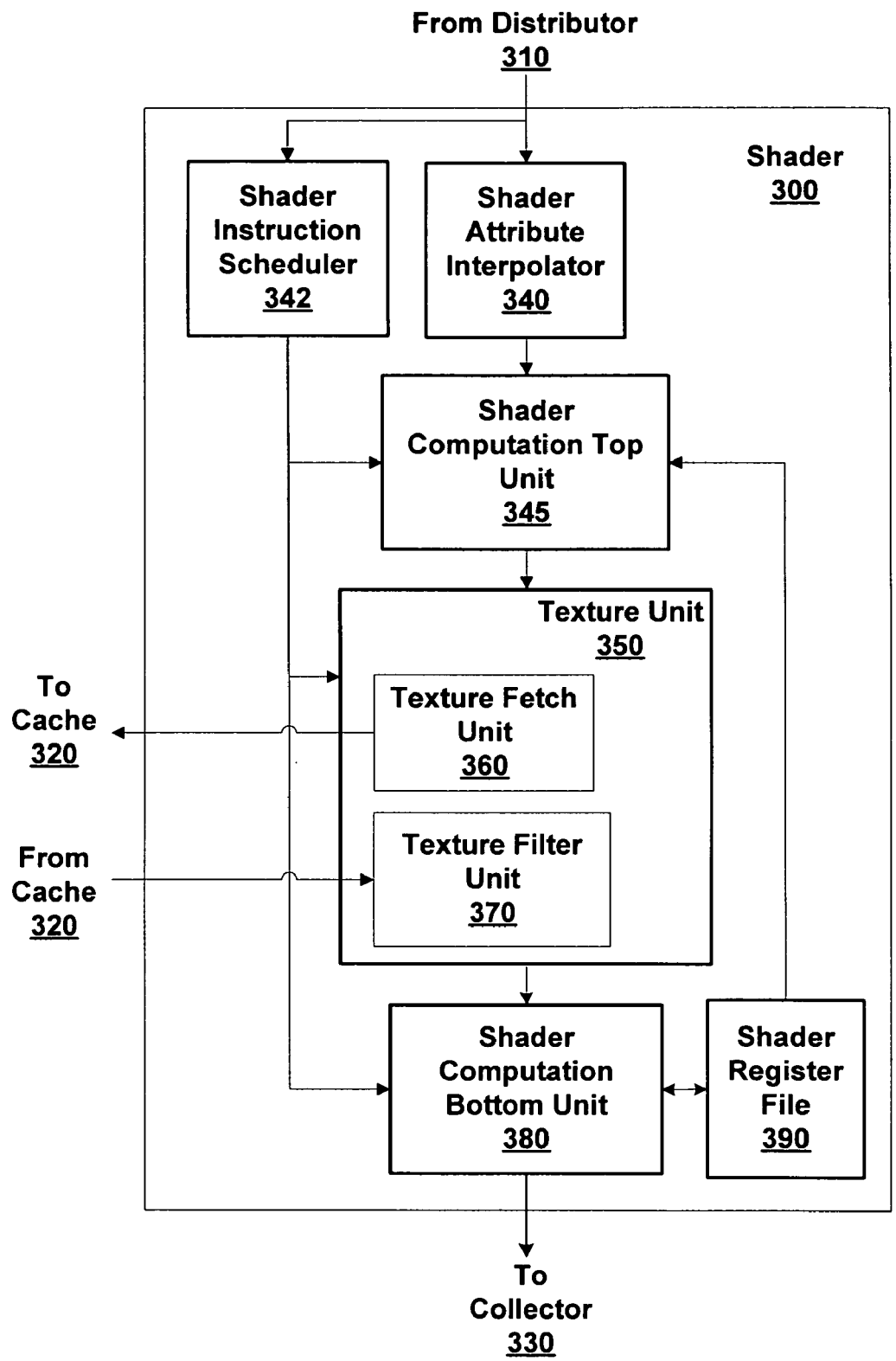
FIG. 3B is a block diagram of an exemplary embodiment of the shader from FIG. 3A in accordance with one or more aspects of the present invention.

FIG. 3B is a block diagram of an exemplary embodiment of shader 300 from FIG. 3A in accordance with one or more aspects of the present invention. A shader instruction scheduler 342 receives optimized sequence of program instructions and schedules each program instruction for execution by a processing unit in a processing pipeline, such as a shader attribute interpolator 340, a shader computation top unit 345, a texture unit 350, or a shader computation bottom unit 380. In some embodiments of the present invention, the optimized sequence of program instructions are read by shader instruction scheduler 345 from local memory 240 via memory management unit 220 or via memory management unit 220 and cache 320.

Shader attribute interpolator 340 produces interpolated attributes, such as texture coordinates, barycentric coefficients, depth (z or w), or the like, that may be sourced by the other processing units within shader 300. Shader computation top unit 340 performs perspective correction of the interpolated attributes and other operations requiring division and multiplication. Texture unit 350 includes a texture fetch unit 360 and a texture filter unit 370. Texture fetch unit 360 computes texture map addresses and fetches texture data via memory management unit 220 and cache 320. In some embodiments of the present invention, cache 320 is omitted and texture unit 350 interfaces directly with memory management unit 220. Texture filter unit 370 receives the texture data and filters the texture data to produce filtered texture data. Shader computation bottom unit 380 receives filtered texture data and interpolated attributes from texture unit 350 and produces shaded fragments. A shader register file 390 is a storage resource used to store temporary values needed during execution of the shader programs.

Each processing unit within shader 300 is configured to execute specific program instructions. Shader instruction scheduler 342 schedules execution of each program instruction for execution by a processing unit that is configured to perform the operation(s) specified by the program instruction. For example, shader attribute interpolator 340 may be configured to perform operations including multiplication, division, and reciprocal. Texture unit 350 may be configured to perform operations including derivative calculations, texture addressing, and interpolation. Shader computation bottom unit 380 may be configured to perform operations including addition, cosine, sine, dot product, logarithm, and multiplication. In other embodiments of the present invention, additional processing units may be included in shader 300.

Because a texture fetch is expensive in terms of latency and memory bandwidth, only necessary texture fetches should be performed to maximize texture processing performance. Avoiding unnecessary uncovered texture fetches may improve texture performance by reducing the number of clock cycles texture unit 350 stalls while waiting for texture data to be received by texture filter unit 370. Furthermore, avoiding unnecessary uncovered texture fetches may reduce the number of texture read requests output by graphics processor 205 to local memory 240, freeing up bandwidth and possibly reducing power requirements for the interface.

Figure 3C:
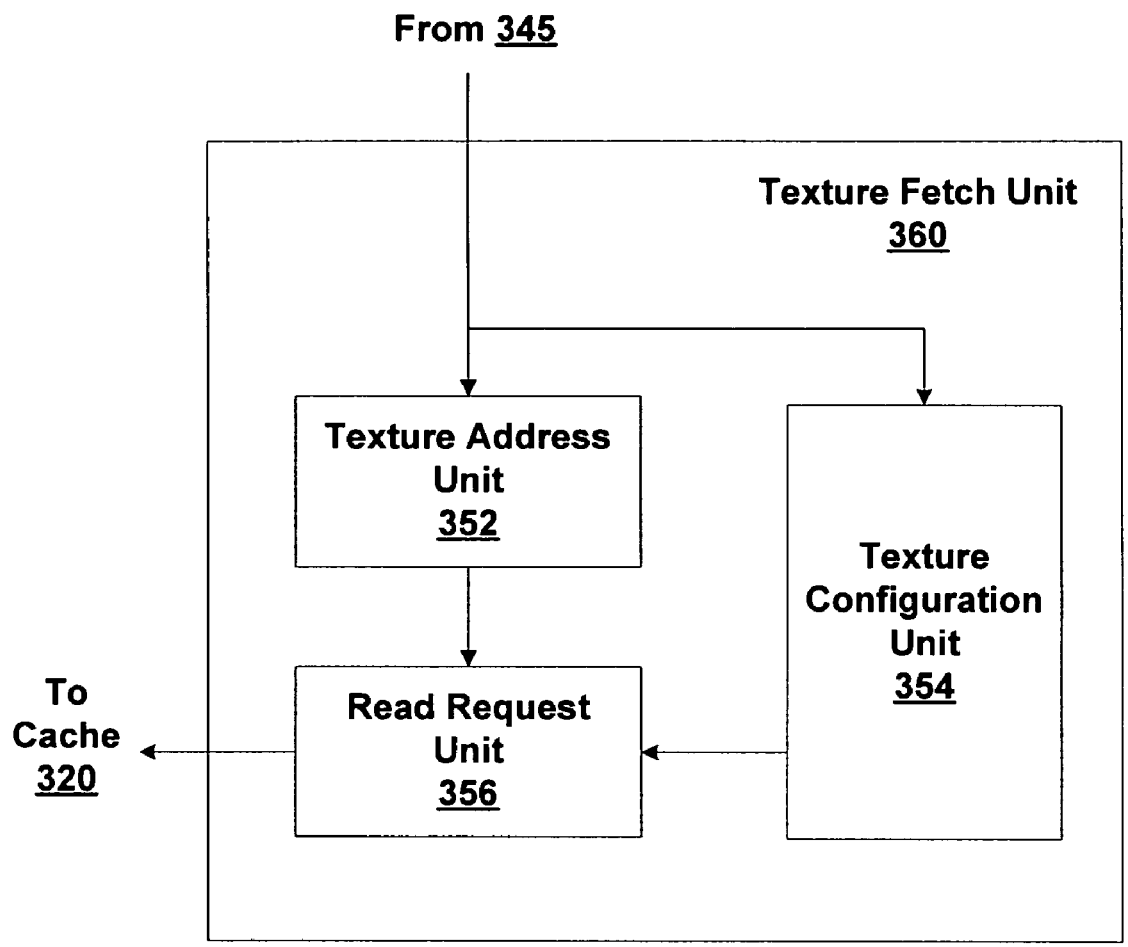
FIG. 3C is a block diagram of an exemplary embodiment of the texture fetch unit from FIG. 3B in accordance with one or more aspects of the present invention.

FIG. 3C is a block diagram of an exemplary embodiment of texture fetch unit 360 from FIG. 3B in accordance with one or more aspects of the present invention. In some embodiments, texture fetch unit 360 receives data, e.g., program instructions, and attributes associated with fragments (coverage information, texture identifiers, texture coordinates such as s, t, and r, and the like) from a rasterizer, such as rasterizer 250.

Texture fetch unit 360 includes a texture address unit 352, a read request unit 356, and a texture configuration unit 354. Texture address unit 352 uses the texture coordinates to compute a LOD for mip mapped textures and texture map addresses. Texture configuration unit 354 receives configuration information produced by driver 213 and fragment coverage information. The configuration information specifies whether or not uncovered texture fetches, i.e., texture fetches for uncovered pixels, should be performed for each texture unit image, i.e. texture identifier. In some embodiments of the present invention, texture configuration unit 354 uncovered texture fetches are enabled or disabled for each texture fetch instruction, independent of the texture identifier. Texture configuration unit 354 provides read request unit 356 with information indicating which texture fetches are necessary. All texture fetches for covered pixels are necessary, but texture fetches for uncovered pixels are only necessary when texture configuration unit 354 is configured to perform uncovered texture fetches. Read request unit 356 generates texture read requests to fetch texels from cache 320.

FIG. 4A illustrates an embodiment of a method for avoiding unnecessary uncovered texture fetches in accordance with one or more aspects of the present invention. In step 400 compiler 211 performs a data-flow analysis of a shader program, as described in conjunction with FIG. 4B, to produce a flag and mask. In step 401 compiler 212 determines a per texture map flag and mask based on the data-flow analysis. In step 405 driver 213 determines filter modes for texture maps used by the shader program and configures texture fetch unit 360, as described in conjunction with FIG. 4C, based on the filter modes, flags, and masks. In step 410 the shader program is executed by graphics processor 205 and texture fetch unit 360 performs texture fetches based on the configuration provided by driver 113.

FIG. 4B illustrates an embodiment of a method for performing step 401 of FIG. 4A in accordance with one or more aspects of the present invention. At compile-time compiler 213 performs a data-flow analysis to identify if fetched texture data for a pixel that is not covered is needed for a subsequent computation. Compiler 211 begins with the output of a given shader program and works backward through the shader program to determine the inputs needed to compute each output. Compiler 211 uses techniques known to those skilled in the art to account for branches, loops, and subroutines during this process. Fragment coverage and filter modes are not known at compile-time. Therefore, compiler 211 provides driver 213 with a flag and mask for each texture map. The flags and masks are then used by driver 213 to determine configuration information based on the per texture map filter modes which are known at run-time. The fragment coverage is determined by rasterizer 250 when the shader program is executed.

In step 420 compiler 211 determines, based on a data-flow analysis of a shader program, if an explicit computation depends on any fetched texture data. Specifically, compiler 211 determines if an explicit partial derivative evaluation, e.g., DDX or DDY command conservatively uses, even indirectly, fetched texture data, and, if so, determines from which texture map(s) the texture data is fetched from. If, in step 420 compiler 211 determines that an explicit partial derivative command uses fetched texture data, then in step 422 compiler 211 sets a flag indicating an explicit partial derivative is computed and proceeds to step 424. The flag corresponds to a particular texture map and step 420 is performed for each active texture map. If, in step 420 compiler 211 determines that fetched texture data is not used by an explicit partial derivative command, then compiler 211 proceeds to step 424.

In step 424 compiler 211 determines if an implicit computation depends on any fetched texture data. Specifically, compiler 211 determines if an implicit partial derivative evaluation conservatively uses, even indirectly, texture data read from one or more texture maps. Compiler 211 also determines which texture map(s) the texture data is fetched from. For example, an implicit partial derivative evaluation occurs when texture data read from a first texture map is used to compute an LOD for a texture fetch from a second texture map, i.e., a dependent texture. Therefore, if first texture data read from the first texture map is used to compute a texture address for a mip mapped second texture map, an implicit partial derivative evaluation will be performed using the first texel data. The first and second texture maps may be any of the active texture maps, even the same texture map. Uncovered texture fetches should be performed when fetching the first texture data that conservatively determine, even indirectly, the texture coordinates to compute the LOD for fetching texture data from the second texture map. Implicit partial derivatives are also computed when anisotropic texture map filtering is performed, even when the texture map doesn't use mip mapped filtering.

If, in step 424 compiler 211 determines, based on a dataflow analysis of a shader program, that an implicit partial derivative command uses fetched texture data, then in step 426 compiler 211 sets mask bits corresponding to one or more texture maps and proceeds to step 428. The mask includes a bit for each texture map that is active for the shader program. There is a mask for each texture map. When N active texture maps are used, compiler 211 determines N N-bit masks. In some embodiments of the present invention, up 16 texture maps may be active. The N masks effectively form an N×N dependency matrix for the particular shader program that indicates for a particular texture map, whether some other texture map (including itself) will potentially use previously fetched texture data for implicit forward differencing.

A bit corresponding to a particular texture map in a mask is set to indicate that uncovered texture fetches should be performed for texels fetched from the texture map corresponding to the mask if the particular texture map is mip mapped, i.e., the filter mode for the particular texture map is mip map. For example, the bit corresponding to the second texture map will be set in the mask for the first texture map. The bit indicates that the texture data fetched from the first texture map (corresponding to the mask) is used in a computation to fetch texture data from the second texture map (corresponding to the bit). Therefore, uncovered texture fetches may need to be performed when reading texture data from the first texture map.

The filter mode is not available at compile-time, but is available at render-time. Therefore, the masks are used by driver 213 in step 405 to determine if a dependent texture fetch is actually a dependent mip mapped texture fetch or otherwise require an implicit finite differencing computation. If, in step 424 compiler 211 determines that fetched texture data is not used by an implicit partial derivative command, then compiler 211 proceeds to step 428. In step 428 compiler 211 determines if another texture map is active, and, if not, proceeds to step 405. If, in step 428 compiler 211 determines that another texture map is active, then compiler 211 returns to step 420 and computes a flag and mask for the other texture map. Steps 420, 424, 426, 428, and possibly step 422 are repeated for each of the active textures.

Figure 4C:
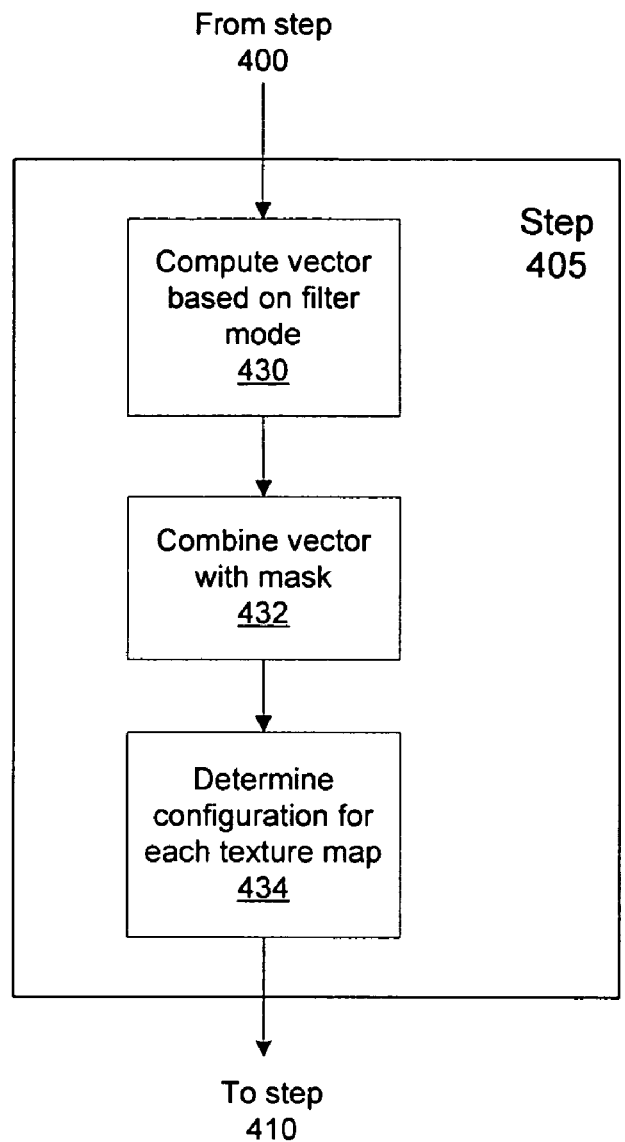
FIG. 4C illustrates an embodiment of a method for determining whether or not uncovered texture fetching is necessary in accordance with one or more aspects of the present invention.

FIG. 4C illustrates an embodiment of a method for determining whether or not uncovered texture fetching is necessary in accordance with one or more aspects of the present invention. Driver 213 determines the per-texture map configuration for texture fetch 350 based on the flag and mask computed by compiler 211 and the filter mode for each texture map. In step 430 driver 213 computes an N bit vector, including one bit for each of N texture maps. A bit corresponding to a texture map is set if the texture map uses mip map filtering or otherwise demands an implicit finite difference computation. In step 432 driver 213 combines the vector computed in step 430 with the masks determined by compiler 211 in step 400. The vector and each mask include N bits, one bit for each of the N texture maps. Driver 213 performs a bit-wise AND of the vector with the mask to produce a result. In step 434 driver 213 determines the per-texture map configuration for texture fetch unit 360 based on the result and the flag for each texture map. Specifically, if the flag is set, indicating an explicit derivative will be computed using texels read from a particular texture map, then driver 213 configures fragment shader 255 to perform uncovered texture fetching for the particular texture map. If the flag is not set, but the result computed in step 432 has at least one bit set, then driver 213 configures fragment shader 255 to perform uncovered texture fetching for the particular texture map. If the flag is not set and the result does not have a bit set, then driver 213 configures fragment shader 255 to disable uncovered texture fetching for the texture map. The configuration information may simply be a single bit per texture map.

Figure 4D:
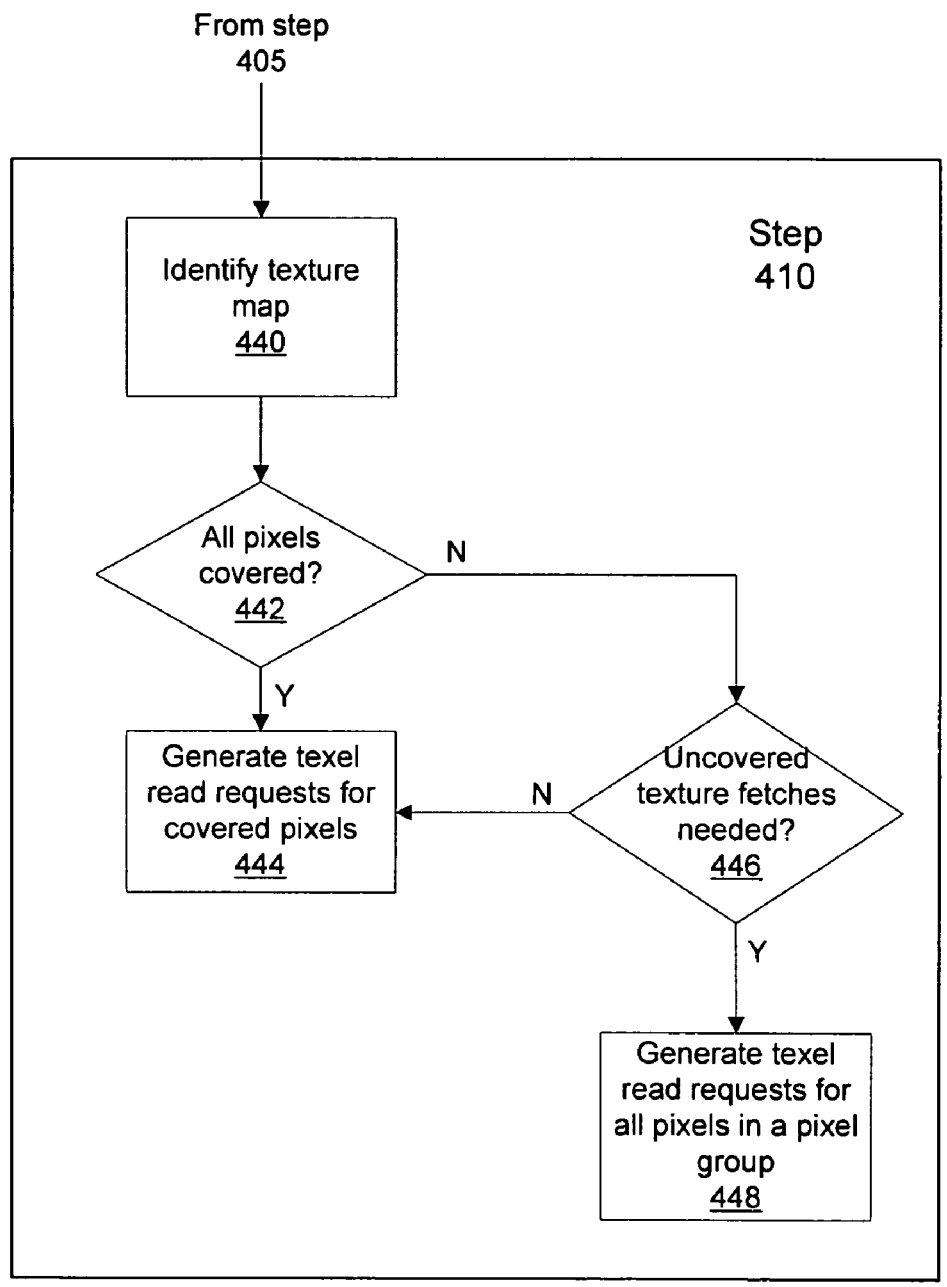
FIG. 4D illustrates an embodiment of a method for performing texture fetching based on driver provided configuration in accordance with one or more aspects of the present invention.

FIG. 4D illustrates an embodiment of a method for performing texture fetching based on the configuration provided by driver 213 in accordance with one or more aspects of the present invention. In step 440 texture fetch unit 360 identifies which of N texture maps is used for a fragment. In step 442 texture fetch unit 360 determines if all of the pixels in a pixel group are covered, and, if so, texture fetch unit 360 proceeds to step 444. Otherwise, in step 446, texture fetch unit 360 determines if uncovered texture fetches are needed, per the configuration provided by driver 213, for the texture map identified in step 440. If, in step 446 texture fetch unit 360 determines that uncovered texture fetches are needed for the texture map, then in step 448 texture fetch unit 360 generates texel read requests for all of the pixels in the pixel group. Otherwise, texture fetch unit 360 proceeds to step 444. In step 444 texture fetch unit 360 only generates texel read requests for the covered pixels in the pixel group. Importantly, step 444 avoids performing paranoid texture fetches for uncovered pixels.

In some embodiments of the present invention, driver 213 modifies the texture instructions to configure fragment shader 255, thereby enabling or disabling uncovered texture fetches for each texture instruction. The texture instructions may be modified to set a single bit enabling uncovered texture fetching. In those embodiments of the present invention, texture fetch unit 360 generates texel read requests for texels of uncovered pixels only when the texture instruction indicates that uncovered texture fetching is enabled. Persons skilled in the art will appreciate that any system configured to perform the method steps of FIG. 4A, 4B, 4C, or 4D or their equivalents, is within the scope of the present invention. In some embodiments of the present invention, the per-instruction and per-texture map configuration approaches may be combined.

Support for per-instruction control of when an uncovered texture fetch is performed may also be applied to non-texture operations to eliminate generic operations on uncovered pixels as a means to reduce power usage or to improve performance. The concentration on eliminating unnecessary texture fetches reflects a focus on reducing the memory bandwidth spent on unnecessary texture fetches because memory bandwidth is the primary resource constraint for contemporary graphics hardware designs.

Figure 5A:
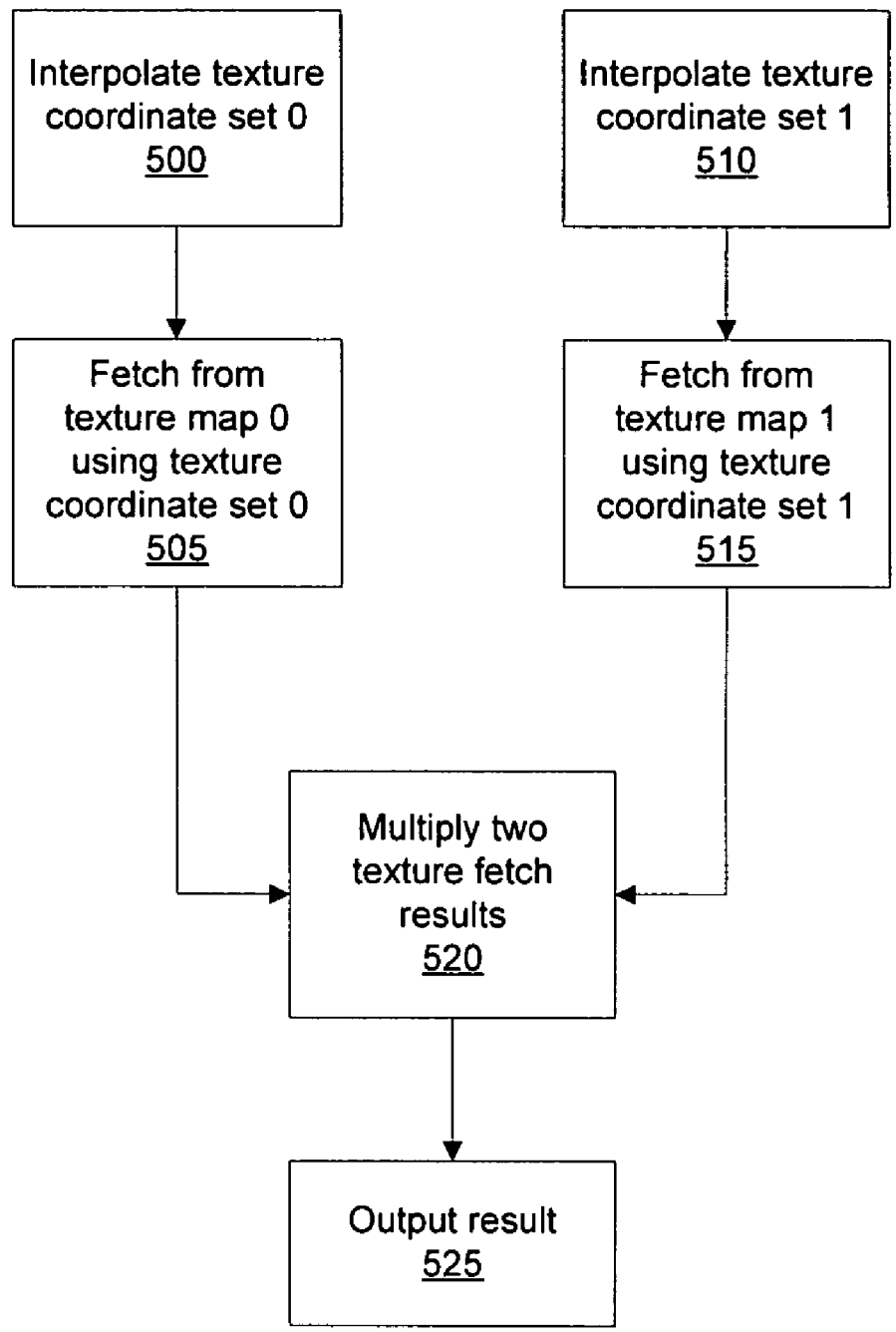
FIGS. 5A, 5B, and 5C illustrate examples of data dependence graphs of shader programs in accordance with one or more aspects of the present invention.
Figure 5B:
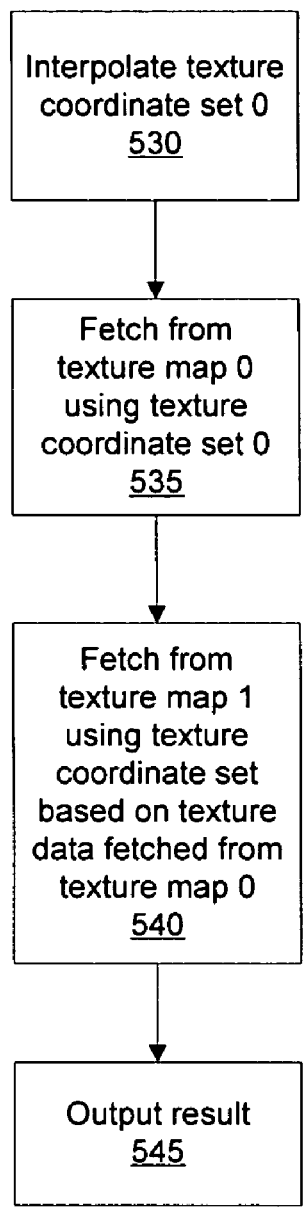
Figure 5C:
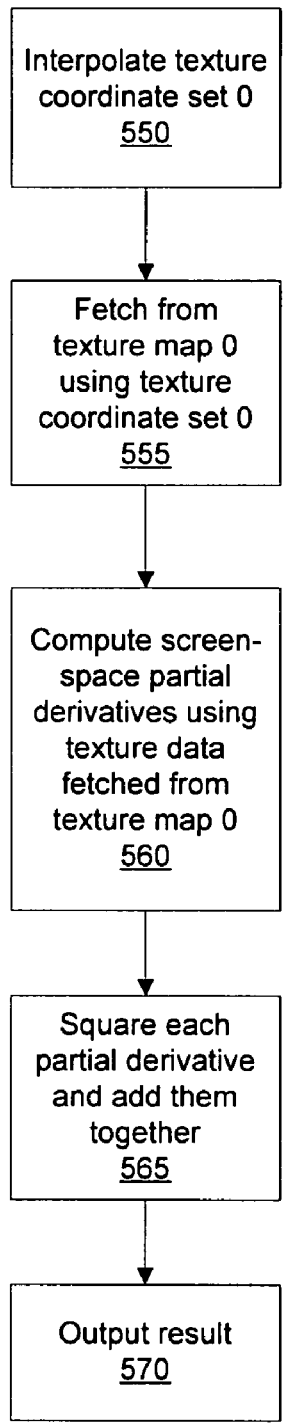

FIGS. 5A, 5B, and 5C illustrate examples of data dependence graphs of shader programs in accordance with one or more aspects of the present invention. FIG. 5A illustrates an example data-flow analysis result of a shader program that does not require any uncovered texture fetches. Output result 525 is produced by operation 520 that multiplies two texture fetch results. Specifically, operation 520 multiplies texture data from texture map 0 and texture data from texture map 1. Operation 505 fetches data from texture map 0 using texture coordinate set 0. Operation 515 fetches data from texture map 1 using texture coordinate set 1. Texture coordinate set 0 and texture coordinate set 1 are interpolated by operations 500 and 510, respectively.

In this example, compiler 213 would not set the flags or any mask bits for texture map 0 or for texture map 1 because the texture data fetched by operations 505 and 515 is not used in a subsequent finite difference computation, either implicit or explicit. If texture map 0 and 1 were mip mapped, partial derivatives would be computed using interpolated texture coordinate set 0 and 1, however, since texture coordinate sets 0 and 1 were not fetched from a texture map there is no need for uncovered texture fetching.

FIG. 5B illustrates an example data-flow analysis result of a shader program that may require uncovered texture fetches. Output result 545 is produced by operation 540 that fetches texture data from texture map 1 using a texture coordinate set based on a previous texture fetch. The texture data fetched from texture map 1 is simply output by operation 545, and therefore compiler 213 would not set the flag or any mask bits for texture map 1.

Operation 535 fetches texture data from texture map 0 using texture coordinate set 0 and operation 530 interpolates fragment attributes to produce texture coordinate set 0. The texture data fetched by operation 535 is used as texture coordinates by operation 545. Therefore, if texture map 1 performs mip map filtering, then finite differencing will be performed on the texture data (fetched from texture map 0) to compute the LOD for texture map 1. Compiler 213 does not set the flag for texture map 0, but does set the mask bit corresponding to texture map 1 since texture data fetched from texture map 0 may used in a subsequent implicit finite difference computation to fetch texture data from texture map 1. Driver 211 sets a bit in the vector corresponding to texture map 1 if texture map 1 performs mip map filtering. When texture map 1 performs mip map filtering, drier 211 enables uncovered texture fetches for texture fetches from texture map 0.

FIG. 5C illustrates an example data-flow analysis result of a shader program that requires uncovered texture fetches. Output result 570 is produced by operation 565 that squares partial derivatives based on a previous texture fetch. Operation 560 computes screen-space partial derivatives of texture data fetched from texture map 0 by operation 555. Operation 550 interpolates fragment attributes to produce texture coordinate set 0. Because operation 560 specifies explicit partial derivative computations, i.e., finite difference computations, using texture data fetched from texture map 0, compiler 213 sets the flag for texture map 0.

Because a texture fetch is expensive in terms of latency and memory bandwidth, only necessary texture fetches should be performed to maximize texture processing performance. Avoiding unnecessary uncovered texture fetches may improve texture performance by reducing the number of clock cycles spent waiting for unnecessary texture data to be fetched. Furthermore, avoiding unnecessary uncovered texture fetches may reduce the number of texture read requests, freeing up bandwidth between graphics memory and graphics processor 205. Reducing this bandwidth also reduces power requirements for the interface. Identification of unnecessary uncovered pixels within a pixel group may also enable processing units within shader 300 to be reallocated to process data to perform other operations on covered pixels or on necessary uncovered pixels rather than perform operations that won't contribute to the final value of a pixel.

While the foregoing is directed to embodiments of the present invention, other and further embodiments of the invention may be devised without departing from the basic scope thereof, and the scope thereof is determined by the claims that follow. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A method of avoiding unnecessary texture fetches, comprising: performing data-flow analysis of a shader program to produce information identifying texture fetches needed to perform a subsequent computation, wherein the data-flow analysis works backward through the shader program to determine inputs needed to compute each shader program output without fetching texture data; enabling the texture fetches needed to perform a subsequent computation for uncovered pixels within a pixel group; and executing the shader program to produce an image and storing said image.

2. The method of claim 1, wherein the subsequent computation is a partial derivative computation.

3. The method of claim 1, wherein the texture fetches are enabled for a particular texture map.

4. The method of claim 1, wherein the pixel group is four adjacent pixels arranged as a 2×2.

5. The method of claim 1, wherein the information includes a flag indicating an explicit partial derivative computation uses texture data fetched from a particular texture map.

6. The method of claim 1, wherein the information includes a mask indicating an implicit partial derivative computation may require texture data fetched from a particular texture map.

7. A method of avoiding unnecessary texture fetches, comprising: determining that first texture data is used to fetch second texture data; enabling texture fetches of the first texture data for uncovered pixels within a pixel group based on whether or not the first texture data is needed to fetch the second texture data, wherein an uncovered pixel is a pixel that is not intersected by a graphics primitive; and outputting and storing an image including the graphics primitive.

8. The method of clam 7, wherein a partial derivative evaluation is performed using the first texture data.

9. The method of clam 8, wherein the partial derivative evaluation is performed by computing a finite difference computation.

10. The method of claim 7, wherein the second texture data is mip map filtered.

11. The method of claim 7, wherein the second texture data is anisotropically filtered.

12. The method of claim 7, further comprising the step of fetching the first texture data only for covered pixels when texture fetches for the uncovered pixels are not enabled.

13. The method of claim 7, further comprising the step of fetching the first texture data for the uncovered pixels when texture fetches for the uncovered pixels are enabled.

14. A system for performing graphics data processing, comprising:
- a graphics driver configured to determine whether or not texture data for uncovered pixels should be fetched from memory and produce configuration information for a shader program, wherein an uncovered pixel is a pixel that is not intersected by a graphics primitive; and
- a graphics processor configured to fetch texture data for uncovered pixels based on the configuration information.

15. The system of claim 14, wherein the graphics driver is configured to insert the configuration information into a texture program instruction to specify whether or not texture data for uncovered pixels should be fetched from memory for the texture program instruction.

16. The system of claim 15, wherein the configuration information is a bit within the texture program instruction.

17. The system of claim 15, wherein the configuration information is included in a texture program instruction generated by the graphics driver and inserted into the shader program.

18. The system of claim 14, wherein the graphics driver produces configuration information corresponding to each texture map used by the shader program.

19. The system of claim 14, further comprising a compiler configured to perform a data-flow analysis of the shader program and indicate whether or not texture data for uncovered pixels is needed for a subsequent operation, wherein the data-flow analysis works backward through the shader program to determine inputs needed to compute each shader program output without fetching the texture data.

20. The system of claim 14, further comprising a compiler configured to perform a data-flow analysis of the shader program and indicate each texture map including texture data that may be used to perform a subsequent implicit partial derivative evaluation, wherein the data-flow analysis works backward through the shader program to determine inputs needed to compute each shader program output without fetching the texture data.

* * * * *